(12) United States Patent
Pai

(10) Patent No.: US 10,819,109 B2
(45) Date of Patent: Oct. 27, 2020

(54) CHIP PROTECTION CIRCUIT

(71) Applicant: PEGATRON CORPORATION, Taipei (TW)

(72) Inventor: Chiu-Yang Pai, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 167 days.

(21) Appl. No.: 16/212,818

(22) Filed: Dec. 7, 2018

(65) Prior Publication Data

US 2019/0222019 A1  Jul. 18, 2019

(30) Foreign Application Priority Data

Jan. 12, 2018 (TW) ............................ 107101315 A

(51) Int. Cl.
*H02H 9/04* (2006.01)
(52) U.S. Cl.
CPC .................. *H02H 9/045* (2013.01)
(58) Field of Classification Search
CPC ........... H02H 9/04; H02H 9/045; H02H 9/046
See application file for complete search history.

(56) References Cited

U.S. PATENT DOCUMENTS

| | | | |
|---|---|---|---|
| 6,385,029 B1 | 5/2002 | Pennington | |
| 2007/0165345 A1* | 7/2007 | Woo | H04L 12/10 361/56 |
| 2008/0037192 A1* | 2/2008 | Huang | H05K 1/026 361/118 |
| 2012/0040559 A1 | 2/2012 | Chang | |
| 2014/0036400 A1* | 2/2014 | Zhou | H02H 9/041 361/56 |
| 2015/0029634 A1 | 1/2015 | Yang | |
| 2016/0126725 A1* | 5/2016 | Khazhinsky | H02H 9/04 361/35 |
| 2016/0294347 A1* | 10/2016 | Xu | H03H 7/0138 |
| 2017/0373489 A1* | 12/2017 | Lin | H04L 12/4625 |

FOREIGN PATENT DOCUMENTS

| | | |
|---|---|---|
| CN | 1255836 A | 6/2000 |
| CN | 102290804 A | 12/2011 |
| JP | 2013247700 A | 12/2013 |
| TW | I408792 B1 | 9/2013 |
| TW | I475803 B | 3/2015 |
| TW | 201547147 A | 12/2015 |

\* cited by examiner

*Primary Examiner* — Gary L Laxton
(74) *Attorney, Agent, or Firm* — McClure, Qualey & Rodack, LLP

(57) ABSTRACT

A chip protection circuit applied to a chip. The chip protection circuit comprises a transformer circuit, a first protection circuit and a second protection circuit. The transformer circuit has a first side and a second side. Each of the first side and the second side is disposed with first terminals, second terminals and center tap terminals. Three center tap terminal is coupled to a ground. The first protection circuit comprises a diode having a terminal coupled to the center tap terminal at the first side and another terminal coupled to the ground. The second protection circuit comprises input terminals and output terminals. The input terminals of the second protection circuit are coupled to the first terminal and the second terminals at the second side. The output terminals of the second protection circuit are coupled to the chip.

16 Claims, 4 Drawing Sheets

CHIP PROTECTION CIRCUIT

CROSS-REFERENCE TO RELATED APPLICATION

This application claims priority to Taiwan Application Serial Number 107101315, filed on Jan. 12, 2018, which is herein incorporated by reference.

BACKGROUND

Technology Field

Present disclosure relates to a chip protection circuit. More particularly, present disclosure relates to a chip protection circuit for protecting the chip from surge signals (e.g. from lightning).

Description of Related Art

In many aspects, electronic devices (e.g. chips) are vulnerable, and easily damaged by the influence of the external environment. For example, the electronic devices can be damaged by ESD and lightning. Therefore, there is a necessity to provide a chip protection circuit for these electronic devices.

SUMMARY

One aspect of the disclosure relates to a chip protection circuit applied to a chip. The chip protection circuit comprises a transformer circuit, a first protection circuit and a second protection circuit. The transformer circuit has a first side and a second side. Each of the first side and the second side is disposed with at least one first terminal, at least one second terminal and at least one center tap terminal. The at least one center tap terminal at the second side is coupled to a ground. The first protection circuit comprises a diode. One terminal of the diode is coupled to the center tap terminal at the first side and another terminal of the diode is coupled to the ground. The second protection circuit comprises input terminals and output terminals. The input terminals of the second protection circuit are coupled to the at least one first terminal and the at least one second terminal at the second side. The output terminals of the second protection circuit are coupled to the chip. In response to that the at least one first terminal and the at least one second terminal at the first side receiving a first surge signal, the at least one center tap terminal at the first side generates at least one induced current according to the first surge signal, and the at least one induced current is guided to the ground via the diode. In response to that a first input terminal of the input terminals receiving a second surge signal, the second protection circuit guides the second surge signal to be outputted from a second input terminal of the plurality of input terminals to the ground.

BRIEF DESCRIPTION OF THE DRAWINGS

Present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. However, the spirit and scope of present disclosure should not be limited to the description of the following embodiments. As such, it is intended that the present disclosure cover structure modifications and variations of this disclosure provided they fall within the scope of present disclosure.

Figure 1:
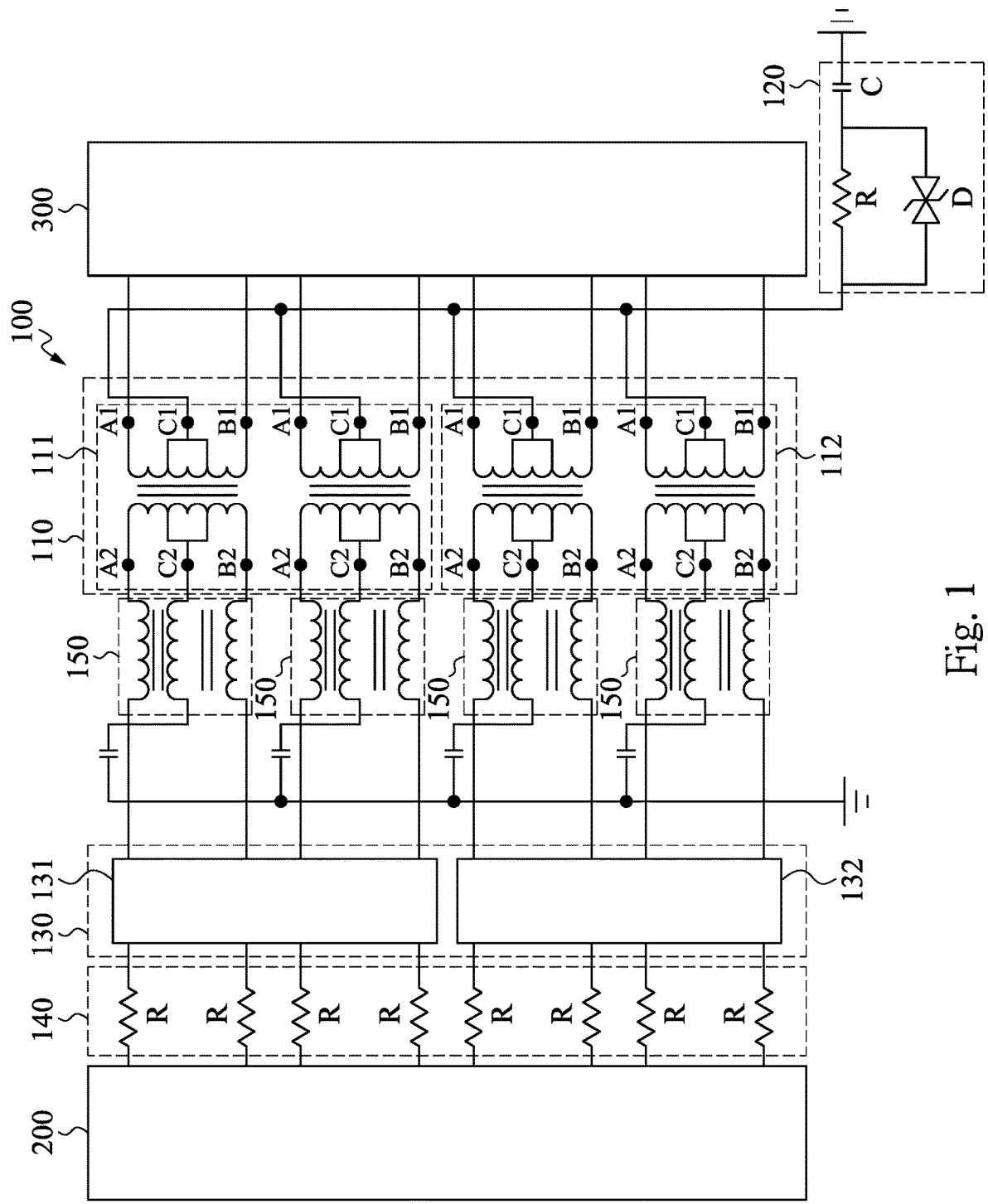
FIG. 1 is a schematic diagram showing a chip protection circuit disposed between a chip and a network cable connector according to some embodiments of the present disclosure.

Reference is made to FIG. 1. FIG. 1 is a circuit diagram of a chip protection circuit 100 disposed between a chip 200 and a network cable connector 300, according to some embodiments of the present disclosure.

The chip protection circuit 100 includes a transformer circuit 110, a first protection circuit 120 and a second protection circuit 130. In one embodiment, the chip protection circuit 100 further includes a third protection circuit 140.

The transformer circuit 110 has a first side (i.e. primary side) at which first terminals A1, second terminals B1 and center tap terminals C1 are arranged. The transformer circuit 110 also has a second side (i.e. secondary side) at which first terminals A2, second terminals B2 and center tap terminals C2 are arranged. The center tap terminals C2 at the second side of the transformer circuit 110 are coupled to a ground via capacitors.

Furthermore, the transformer circuit 110 includes a first transformer set 111 including two first transformers and a second transformer set 112 including two second transformers. At the first side (i.e. the primary side) of the transformer circuit 110, each of the first transformers has one of the first terminals A1, the second terminals B1 and the center tap terminals C1. At the second side (i.e. the secondary side) of the transformer circuit 110, each of the first transformers has one of the first terminals A2, the second terminals B2 and the center tap terminals C2. The center tap terminals C2 ate the second side of the first transformers are coupled to the ground via the capacitors. At the first side (i.e. the primary side) of the transformer circuit 110, each of the second transformers has one of the first terminals A1, the second terminals B1 and the center tap terminals C1. At the second side (i.e. the secondary side) of the transformer circuit 110, each of the second transformers has one of the first terminals A2, the second terminals B2 and the center tap terminals C2. The center tap terminals C2, at the second side, of the second transformers are coupled to the ground via the capacitors. The first protection circuit 120 includes a diode D having a first terminal and a second terminal. The first terminal of the diode D is coupled to the center tap terminals C1, at the first side, of the first transformers and those of the second transformers. The second terminal of diode D is coupled to the ground. In one embodiment, the first protection circuit 120 further includes a resistance R coupled in parallel with the diode D. In one embodiment, the first protection circuit 120 further includes a capacitor C coupled to the resistance R in series.

In one embodiment, the diode D is a transient-voltage-suppression (TVS) diode.

The second protection circuit 130 includes input terminals and output terminals. The input terminals of the second protection circuit 130 are coupled to the first terminals A2, the second terminals B2 and the center tap terminals C2, at the second side, of the first transformers and those of the second transformers. The output terminals of the second protection circuit 130 are coupled to the chip 200.

Furthermore, the second protection circuit 130 includes a first protection chip 131 and a second protection chip 132. The first protection chip 131 and the second protection chip 132 both include the input terminals and the output terminals. The input terminals of the first protection chip 131 are coupled to the first terminals A2, and the second terminals B2, at the second side, of the first transformers. The input terminals of the second protection chip 132 are coupled to the first terminals A2 and the second terminals B2, at the second side, of the second transformers. In one embodiment, the first protection chip 131 and the second protection chip 132 are TVS chips.

The second protection circuit 140 includes resistances R coupled to the output terminals of the second protection circuit 130 and the input terminals of the chip 200.

In one embodiment, the chip protection circuit 100 further includes chokes 150 coupled to the transformer circuit 110 and the second protection circuit 130.

Moreover, each of the chokes 150 includes an input terminal and an output terminal. The input terminals of the chokes 150 are coupled to the first terminals A2, the second terminals B2 and the center tap terminals C2, at the second side, of the transformer circuit 110. The output terminals of the chokes 150 are coupled to the input terminals of the second protection circuit 130.

Figure 2:
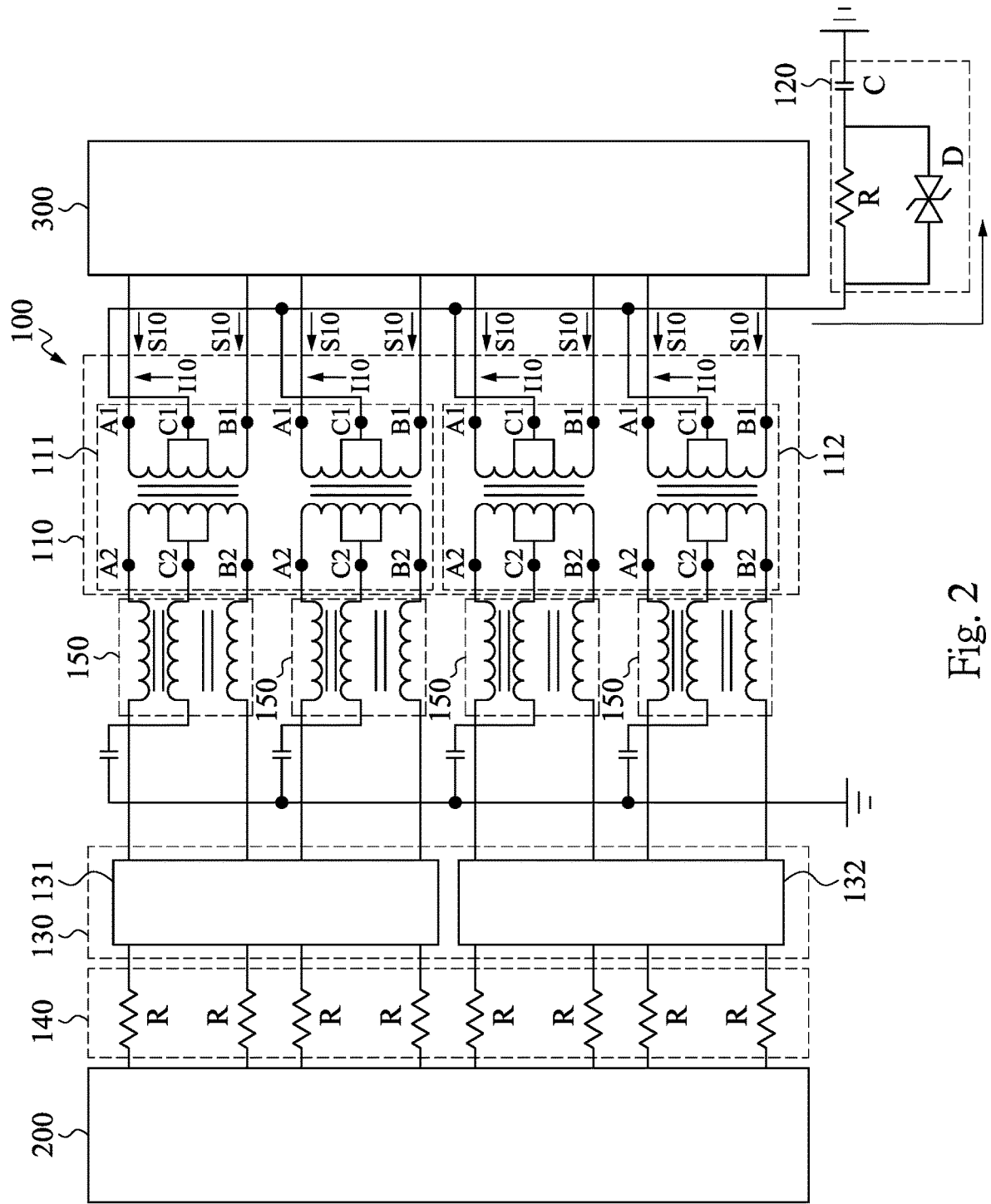
FIG. 2 is a schematic diagram showing a case of first surge signals passing the chip protection circuit according to some embodiments of the present disclosure.

Reference is made to FIG. 2. FIG. 2 is a schematic diagram showing a case of first surge signals S10 passing the chip protection circuit 100 according to some embodiments of the present disclosure.

When the first terminals A1 and the second terminals B1, at the first side, of the first transformers in the first transformer set 111 and those of the second transformers in the second transformer set 112 receive first surge signals S10, based on characteristics of the first transformers and the second transformers, the center tap terminals C1 may generate first induced currents 110 according to the first surge signals S10. Then, the first induced currents 110 flow into the first protection circuit 120. Since the inductive potential of the first induced currents 110 is higher than the breakdown voltage of the diode D of the first protection circuit 120, the diode D is turned on. Accordingly, the first induced currents 110 are guided to the ground via the capacitor C (along the direction shown by an arrow). In one embodiment, the breakdown voltage of the diode D may be, but not limited to, 6.4V-7.0V. In this manner, the induced currents 110 can be by-passed to the ground via a guided path instead of flowing into chip 200, and thus the chip 200 can be prevented from being damaged by the first induced currents 110.

When the first terminals A1 and the second terminals B1, at the first side, of the first transformers in the first transformer set 111 and those of the second transformers in the second transformer set 112 receive common signals, the center tap terminals C1 may generate common induced currents according to the common signals. Then, the common induced currents flow into the first protection circuit 120. Since the inductive potential of the common induced currents is lower than the breakdown voltage of the diode D of the first protection circuit 120, the diode D is not turned on. Thus, the common induced currents can be guided to the ground via the resistance R and the capacitor C.

In other words, the resistance R can be employed to form a conducting path for normal signals, and to operate as a terminal resistor.

In one embodiment, the first surge signals S10 are common-mode signals.

Figure 3:
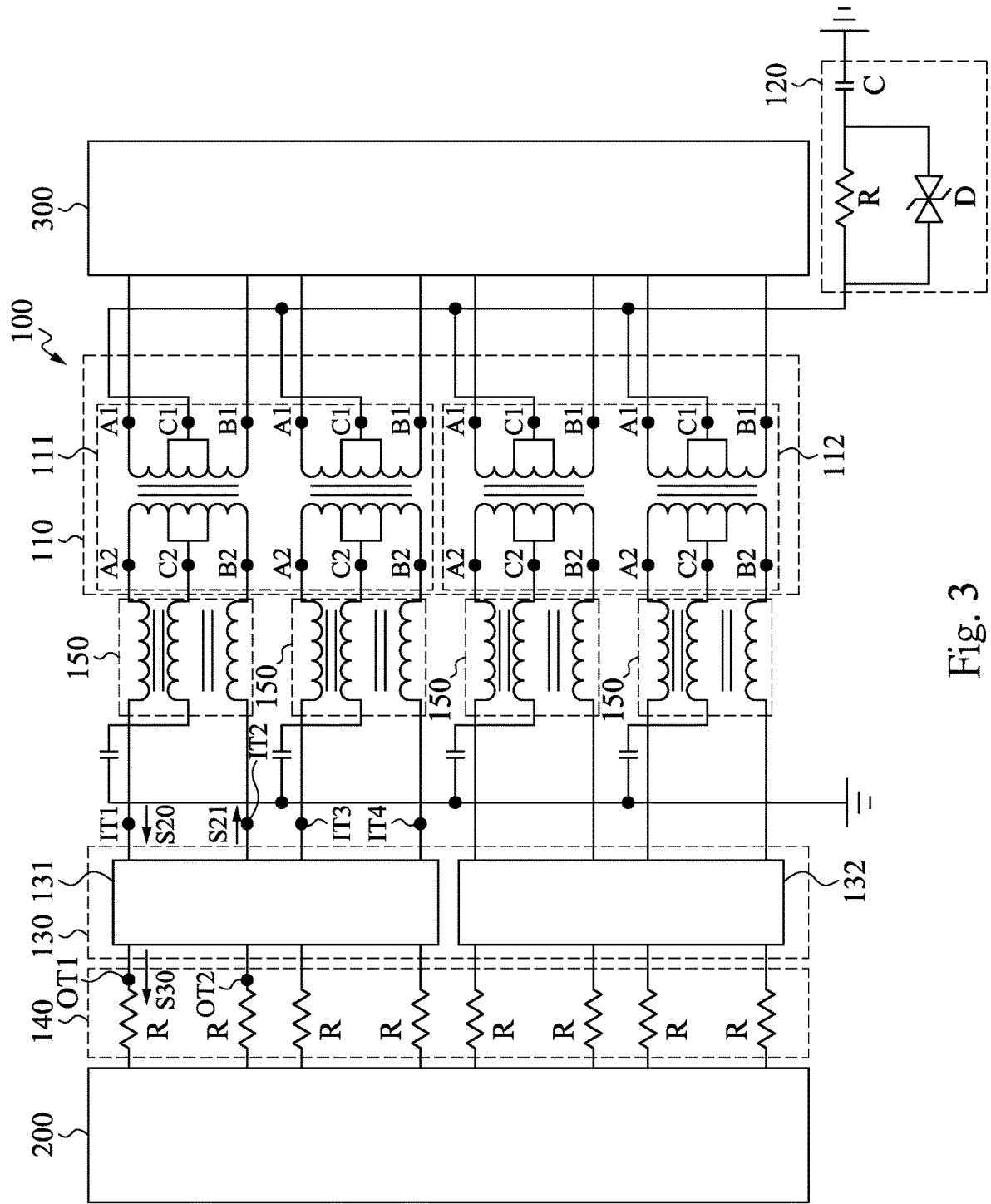
FIG. 3 is a schematic diagram showing a case of second and third surge signals passing the chip protection circuit according to some embodiments of the present disclosure.

Reference is made to FIG. 3. FIG. 3 is a schematic diagram showing a case of second surge signals S20 and third surge signals S30 passing the chip protection circuit 100 according to some embodiments of the present disclosure.

In the second protection circuit 130, when a first input terminal IT1 of the first protection chip 131 receives a second surge signal S20, based on characteristic of the first protection chip 131, the second surge signal S20 can be divided into distributed second surge signals S21. The distributed second surge signals S21 can be guided to the ground via at least one (maybe two or all) of the second input terminals 1T2, the third input terminals 1T3 and the fourth input terminals IT4. In the embodiment of FIG. 3, as an example, the distributed second surge signal S21 may flow into the second input terminals IT2. In this manner, the second surge signal S20 can be by-passed to the ground, and the chip 200 can be prevented from being damaged by the second surge signal S20.

In a case that part of the second surge signal S20 (e.g. third surge signal S30) are not guided to the ground via the second input terminals IT2 of the first protection chip 131, the third surge signal S30 may be outputted from the first output terminal OT1 of the first protection chip 131. The third surge signal S30 can be attenuated by the resistance R couple to the first output terminal OT1 so that the chip 200 would not be damaged by the third surge signal S30.

It is understood that the operations of the protection chip 132 are similar to the operations of the first protection chip 131 shown in the embodiment above.

Figure 4:
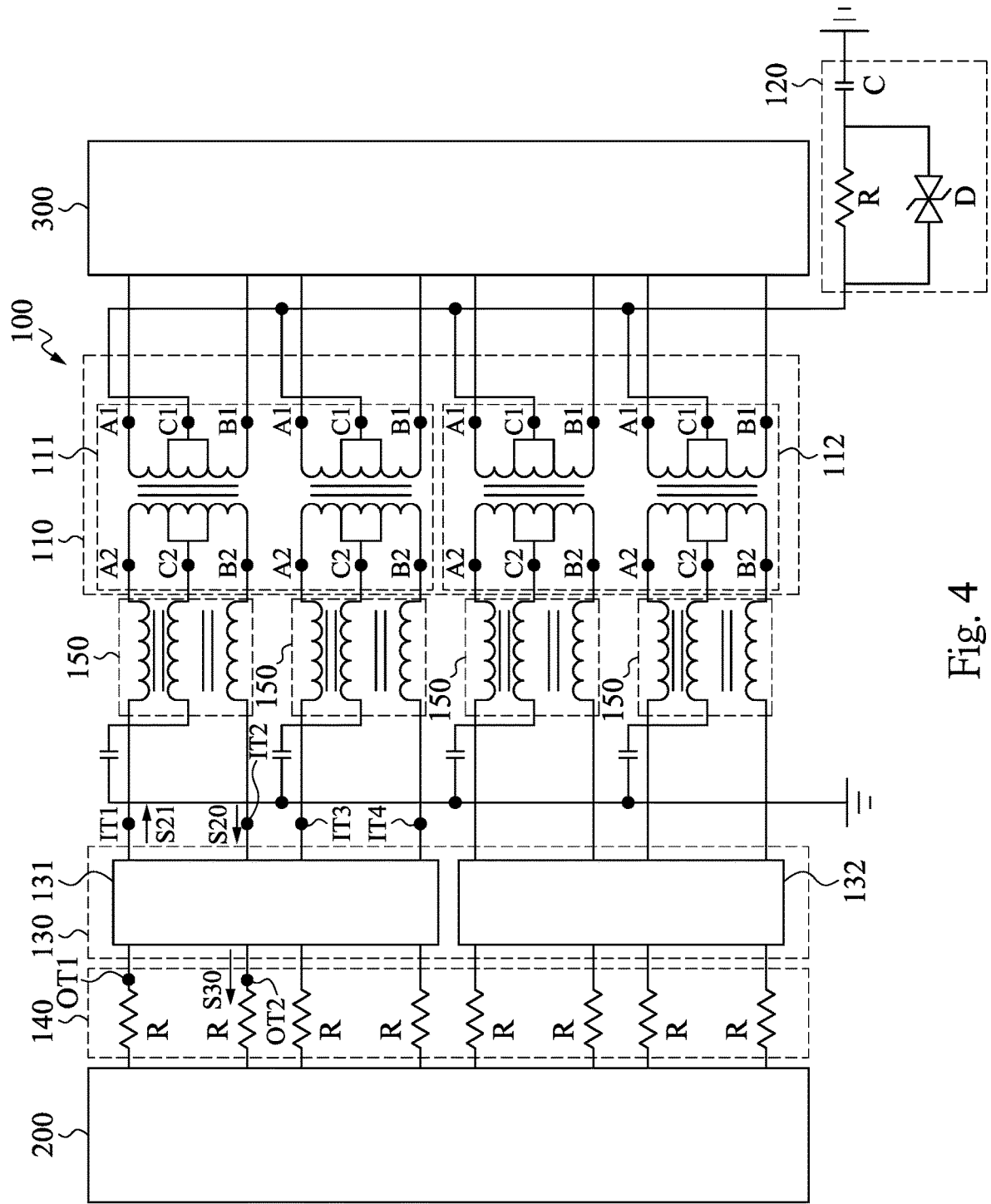
FIG. 4 is a schematic diagram showing a case of second and third surge signals passing the chip protection circuit according to some embodiments of the present disclosure.

Reference is made to FIG. 4. FIG. 4 is a schematic diagram showing a case of second surge signals S20 and third surge signals S30 passing the chip protection circuit 100 according to some embodiments of the present disclosure.

In the second protection circuit 130, when the first input terminal IT1 of the first protection chip 131 receives the second surge signal S20, based on the characteristic of the first protection chip 131, the second surge signal S20 can be divided into distributed second surge signals S21. The distributed second surge signals S21 can be guided to the ground via at least one (maybe two or all) of the second input terminals IT2, the third input terminals IT3 and the fourth input terminals IT4. In the embodiment of FIG. 4, as an example, the distributed second surge signal S21 may flow into the first input terminals IT1. In this manner, the second surge signal S20 can be by-passed to the ground, and the chip 200 can be prevented from being damaged by the second surge signal S20.

In a case that part of the second surge signal S20 (e.g. third surge signal S30) are not guided to the ground via the first input terminals IT1 of the first protection chip 131, the third surge signal S30 may be outputted from the second output terminal OT2 of the first protection chip 131. The third surge signal S30 can be attenuated by the resistance R couple to the second output terminal OT2 so that the chip 200 would not be damaged by the third surge signal S30.

It is noted that the number of the transformers in the transformer circuit 110, the number of the chips in the second protection circuit 130 and the number of the chokes 150 are merely examples but limitations of present disclosure. In another embodiment, the transformer circuit 110 of the chip protection circuit 100 can only include a single transformer (i.e. the first transformer), the second protection circuit 130 can only include a single protection chip (i.e. the first protection chip 131), and there is only a single choke 150 disposed between the first transformer and the second protection circuit 130. In other words, in some embodiments, the number of the transformers (i.e. the first transformer), the chokes (i.e. the choke 150) and the protection chip (i.e. the first protection chip 131) can be one. It is understood that the operations of the first transformer, the choke 150 and the first protection chip 131 are as same as described in foregoing embodiments and not being repeated here.

In the following, some practical cases configured with the chip protection circuit 100 can be provided.

The chip 200 can be an internal chip of a gateway. The network cable connector 300 can be a RJ-45 connector. The chip protection circuit 100 is coupled to the chip 200 and the network cable connector 300 through eight high speed Ethernet cables.

When a surge signal generated by static or lighting passes the network cable connector 300, the chip protection circuit 100 can leak the surge signal (e.g. common-mode signals or differential signals) to the ground so that the surge signal would not flow into the chip 200 or other electronic units. As such, the chip 200 or other electronic units are protected from being damaged.

Moreover, the chip protection circuit 100 of present disclosure is applicable to current Ethernet test standards, which provides the manufacturers more advantages.

As mentioned, the chip protection circuit of present disclosure can leak the first, the second, and the third surge signals to the ground via the transformer circuit, the first protection circuit and the second protection circuit so as to protect the chip 200 or other electronic units from being damaged. Therefore, a purpose of chip protection is achieved.

Although the present disclosure has been described in considerable detail with reference to certain embodiments thereof, other embodiments are possible. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A chip protection circuit, applied to a chip, the chip protection circuit comprising:
   a transformer circuit comprising at least one first terminal, at least one second terminal and at least one center tap terminal that are arranged at each of a first side and a second side, and the at least one center tap terminal at the second side is coupled to a ground;
   a first protection circuit comprising a diode, wherein one terminal of the diode is coupled to the center tap terminal at the first side, and another terminal of the diode is coupled to the ground; and
   a second protection circuit comprising a plurality of input terminals and a plurality of output terminals, wherein the plurality of input terminals are coupled to the at least one first terminal and the at least one second terminal on the second side, and the plurality of output terminals are coupled to the chip,
   wherein in response to the at least one first terminal and the at least one second terminal at the first side receiving a first surge signal, the at least one center tap terminal at the first side generates at least one first induced current according to the first surge signal, and the at least one first induced current is guided to the ground via the diode,
   wherein in response to a first input terminal of the plurality of input terminals receiving a second surge signal, the second protection circuit guides the second surge signal to be outputted from a second input terminal of the plurality of input terminals to the ground.

2. The chip protection circuit of claim 1, further comprising:
   a third protection circuit comprising a plurality of resistances, wherein the plurality of resistances are coupled to the plurality of output terminals of the second protection circuit and a plurality of input terminals of the chip,
   wherein in response to a first output terminal of the plurality of output terminals of the second protection circuit receiving a third surge signal, the third surge signal is attenuated after flowing through one resistance, coupled to the first output terminal, of the plurality of resistances.

3. The chip protection circuit of claim 2, wherein the first surge signal is a common-mode signal, and the second surge signal and the third surge signal are differential-mode signals.

4. The chip protection circuit of claim 1, further comprising:
   at least one choke, coupled between the transformer circuit and the second protection circuit.

5. The chip protection circuit of claim 4, wherein the at least one choke comprises three input terminals and three output terminals, the three input terminals of the at least one choke are coupled to the at least one first terminal, the at least one second terminal and the at least one center tap terminal at the second side t, and two of the three output terminals of the at least one choke are coupled to the plurality of input terminals of the second protection circuit.

6. The chip protection circuit of claim 1, wherein the transformer circuit comprises a transformer, the transformer comprises one of the at least one first terminal at the first side, one of the at least one second terminal at the first side and one of the at least one center tap terminal at the first side, and the transformer further comprises one of the at least one first terminal at the second side, one of the at least one second terminal at the second side and one of the at least one center tap terminal at the second side.

7. The chip protection circuit of claim 6, wherein the second protection circuit comprises a protection chip comprising two input terminals and two output terminals, the two input terminals are coupled to the one of the at least one first terminal at the second side of the transformer and the one of the at least one second terminal at the second side of the transformer, respectively.

8. The chip protection circuit of claim 7, further comprising:

a choke, coupled between the transformer and the protection chip.

9. The chip protection circuit of claim 8, wherein the choke comprises three input terminals and three output terminals, the three input terminals of the choke are coupled to one of the at least one first terminal on the second side, the one of the at least one second terminal on the second side and the one of the at least one center tap terminal on the second side, and two of the three output terminals of the choke are coupled to the two input terminals of the protection chip.

10. The chip protection circuit of claim 1, wherein the transformer circuit comprises four transformers, each of the four transformer comprises one of the at least one first terminal, one of the at least one second terminal and one of the at least one center tap terminal that are at the first side and comprises one of the at least one first terminal, one of the at least one second terminal and one of the at least one center tap terminal that are at the second side.

11. The chip protection circuit of claim 10, wherein the second protection circuit comprises two protection chips, each of the two protection chips comprises four input terminals and four output terminals, and the four input terminals of each of the two protection chips are coupled to two of the four transformers via the one of the at least one second terminal at the first side and the one of the at least one second terminal at the second side.

12. The chip protection circuit of claim 11, further comprising:
four chokes, coupled between the transformer circuit and the second protection circuit.

13. The chip protection circuit of claim 12, wherein each of the four chokes comprises three input terminals and three output terminals, the three input terminals of the four chokes are coupled to the four transformers via one of the at least one first terminal, the one of the at least one second terminal and the one of the at least one center tap terminal that are arranged at the second side, and two of the three output terminals of the choke are coupled to the four input terminals of the two protection chips.

14. The chip protection circuit of claim 1, wherein the first protection circuit further comprises a resistance coupled in parallel with the diode.

15. The chip protection circuit of claim 1, wherein the first protection circuit further comprises a capacitor coupled to the resistance in series.

16. The chip protection circuit of claim 1, wherein the diode is a transient-voltage-suppression diode.

* * * * *